(No Model.)

A. H. PERKINS.
FOOT TUB.

No. 335,838. Patented Feb. 9, 1886.

WITNESSES.
W. P. Clough.
H. W. Stearns.

INVENTOR.
Alfred H. Perkins,
pr Norman W. Stearns,
Atty.

(No Model.) 2 Sheets—Sheet 2.

A. H. PERKINS.
FOOT TUB.

No. 335,838. Patented Feb. 9, 1886.

WITNESSES
W. P. Clough.
H. W. Stearns.

INVENTOR
Alfred H. Perkins,
pr Norman W. Stearns,
Atty.

UNITED STATES PATENT OFFICE.

ALFRED H. PERKINS, OF LEOMINSTER, MASSACHUSETTS.

FOOT-TUB.

SPECIFICATION forming part of Letters Patent No. 335,838, dated February 9, 1886.

Application filed March 30, 1885. Serial No. 160,679. (No model.)

*To all whom it may concern:*

Be it known that I, ALFRED H. PERKINS, of Leominster, in the county of Worcester and State of Massachusetts, have invented certain Improvements in Foot-Tubs, of which the following is a full, clear, and exact description, reference being had to the accompanying drawings, making part of this specification, in which—

Figure 1:
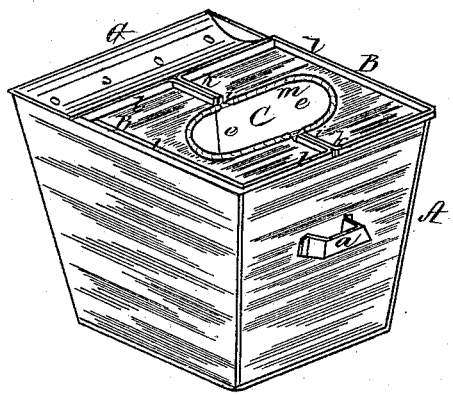
Figure 2:
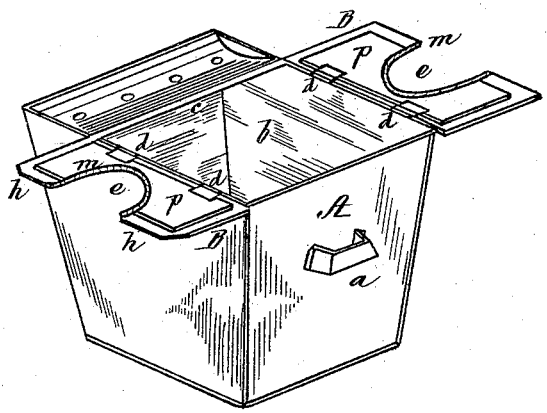
Figure 3:
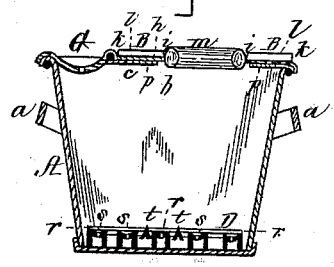
Figure 4:
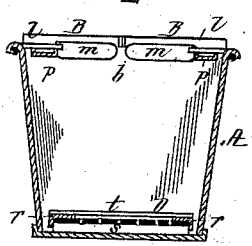
Figure 5:
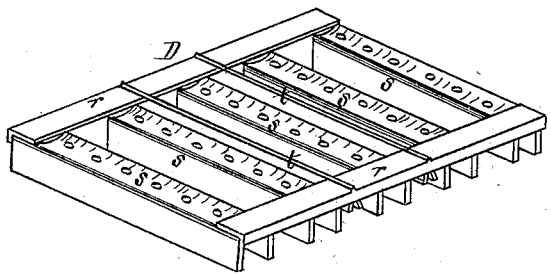
Figure 6:
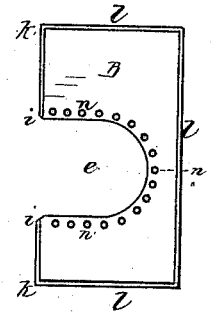

Figure 1 is a perspective view of my foot-tub, ready for use. Fig. 2 is a view of the same with its top open. Fig. 3 is a vertical longitudinal section through the center of the tub, with its top closed. Fig. 4 is a vertical transverse section through the center of the same. Fig. 5 is a perspective view of the removable foot-rest located at the bottom of the tub; Fig. 6, detail, to be referred to.

My present invention has for its object to afford increased facilities for bathing and cleansing the feet; and it consists in a receptacle having a cover so formed as to fit around the legs, thus retaining for a longer time the desired temperature of the water within the receptacle while the feet are being washed, in combination with certain foot-rests, one located within the receptacle for supporting the feet at a short distance above its bottom, to allow of the free circulation of the water to the soles of the feet, said rest being provided, if desired, with suitable devices upon which the soles may be rubbed to effect the removal of the hard skin collected thereon, whereby they are more thoroughly and quickly cleansed than were the soles to rest directly on the bottom of the receptacle, the other foot-rest being perforated and located outside of the top of the same, to allow of the drainage of water from the feet (while being wiped) to be returned into the receptacle, the aforesaid features of foot-rests endowing the tub with all the facilities desired for bathing, cleansing, and wiping the feet, all being at hand in the most convenient location for use.

To enable others skilled in the art to understand and use my invention, I will proceed to describe the manner in which I have carried it out.

In the said drawings, A represents a receptacle provided with a pair of handles, $a\ a$, to make it portable, and preferably formed of sheet-tin, paper-pulp rendered water-proof, or other suitable material of light weight. The shape of the receptacle is preferably slightly larger at the top than at its bottom. Extending around the inside of the front of the opening $b$ in the top of the receptacle is a narrow horizontal ledge, $c$, which with the opposite or back side of the top thereof form supports for the sides of the covers B B, (preferably made in two equal portions or sections,) each hinged at $d$ to the side of the receptacle contiguous thereto. Each cover is provided with an opening, $e$, of a form and size adapted to receive and fit the calf of one of the legs, the aperture C, formed by the two openings $e\ e$ when the covers are closed over the opening $b$, being of oblong shape and located centrally thereover. (See Fig. 1.) One cover B has a horizontal ledge, $h$, extending along the straight portions $i\ k$ of the side opposite that which is hinged, said ledge forming a support for the contiguous corresponding straight portions of the other cover B. Each of the three straight sides of each cover B, as well as each of the four contiguous straight portions $i\ k$ of the remaining sides of the covers, is provided with a vertical flange, $l$, the four flanges $l\ l\ l\ l$ of the four straight portions $i k\ i k\ i k\ i k$ abutting each other when the covers are swung down over the top of the receptacle. Around and a little way inside of the edge of the opening $e$ of each cover is secured a strip, $m$, of soft textile or fibrous material, which serves as a cushion to prevent the calf of the leg from being chafed, a series of perforations, $n$, being made for the passage of the fastening by which the cushion is held in place. (See Fig. 6.) The under side of each cover may be re-enforced by an additional thickness, $p$, of the material of which it is composed, thus avoiding all liability of bending the same, Figs. 2, 3, and 4.

Upon the bottom of the receptacle A is located a foot-rest, D, consisting of a pair of parallel side pieces, $r$, having secured thereto a series of perforated transverse bars, $s$, of trough shape in cross-section, (see Figs. 3 and 5,) said pieces $r$ having also secured thereto transverse strips $t$, (of $\wedge$ shape in cross-section, slightly rounded at their tops,) interposed between the bars $s$, the pieces $r$, with their bars $s$ and strips $t$, constituting a combined foot rest and scraper. The sides of the bars *s* rest on the bottom of the receptacle, while the ends of the bars and ends of the scrapers are left open, and the sides of the pieces *r* extend only part way down, so as to leave room for the free passage of the water under the rest and up through the perforations in the bars *s* to the soles of the feet resting thereon.

The office of the strips or scrapers *t* is to allow the feet to be drawn or rubbed thereon to facilitate the softening and removal of the thick skin which usually gathers on the heel and other portions of the bottom of the feet.

At one end (front end) of the top of the receptacle A is located a perforated trough-shaped rest, G, (see Figs. 1 and 3,) for the feet when they are to be wiped after being bathed and cleansed, the perforations in this last-mentioned or upper foot-rest allowing of the drainage back into the receptacle A of any water that may be carried up with the feet as they are raised out of the water.

The form of the foot receptacle or tub A is not arbitrary, but one of rectangular form, or nearly so, is perhaps most convenient for use, and can be furnished at a low cost.

The perforations in the cross-bars *s* may be omitted; but I prefer to employ them, as thereby a better circulation of water to the soles is insured.

The construction and form of the two foot-rests may be somewhat varied, and the location of the upper rest may be at the side of the top nearest the bather, and the scrapers may be omitted, if desired, without impairing the general efficiency of my invention; but I prefer to assemble the several features herein mentioned, as thereby I produce a foot-tub complete in all of the conveniences and requirements essential to a thorough and expeditious cleansing of the feet.

When the feet are in a tub of my construction, a towel may be placed over the aperture C, around the legs, whereby the warm vapors are prevented from escaping from the same and coming into contact with and dampening the clothing of the bather, an unavoidable occurrence where an open tub or pail is used, the danger of taking cold incident thereto being also avoided.

I claim—

1. As an improvement in foot bath-tubs, the upper foot-rest, G, provided with perforations, for the purpose specified.

2. A foot-tub consisting of the receptacle A, having covers B B, provided with openings *e e*, the upper perforated foot-rest, G, and the lower foot-rest, D, as and for the purpose described.

3. A foot rest and scraper combined, consisting of side pieces, *r*, with their cross-bars *s* and cross-strips *t*, when constructed for use in a foot-tub A, having covers B B, substantially as described.

Witness my hand this 17th day of March, 1885.

ALFRED H. PERKINS.

In presence of—
N. W. STEARNS,
JAS. W. CHAPMAN.